(No Model.)
G. SHONE.
FAUCET.
No. 290,124. Patented Dec. 11, 1883.
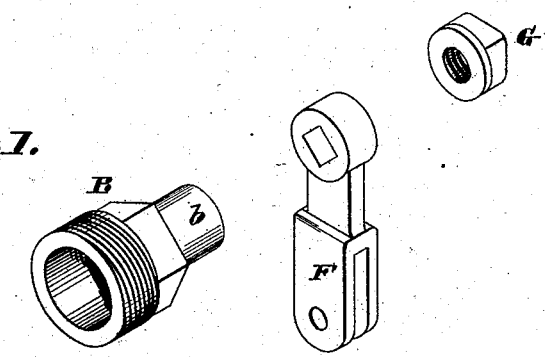
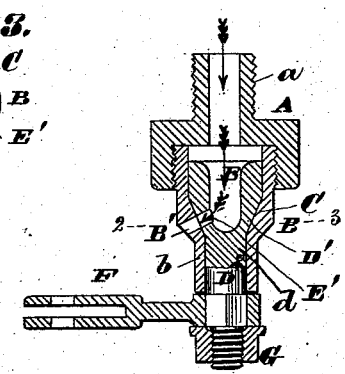
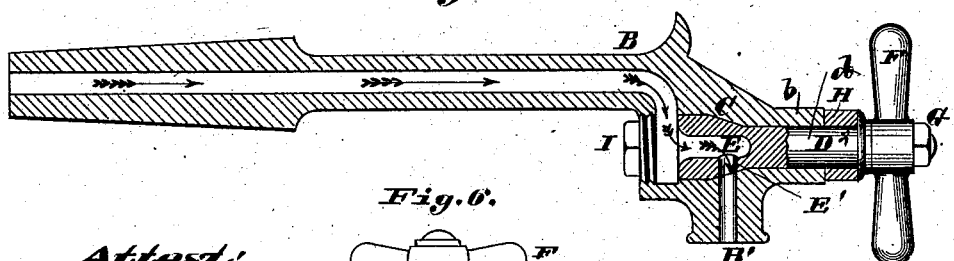
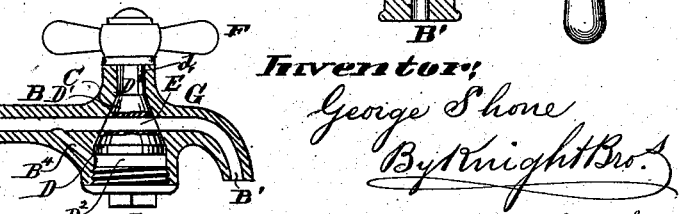
Attest:
Wm. J. Sayers
Chas. C. Bucky
Inventor:
George Shone
By Knight Bros.
Attys

UNITED STATES PATENT OFFICE.

GEORGE SHONE, OF EAST ST. LOUIS, ASSIGNOR OF ONE-HALF TO AUGUSTUS M. DE CLERCQ, OF BELLEVILLE, ILLINOIS.

FAUCET.

SPECIFICATION forming part of Letters Patent No. 290,124, dated December 11, 1883.

Application filed March 22, 1883. (No model.)

*To all whom it may concern:*

Be it known that I, GEORGE SHONE, of East St. Louis, in the county of St. Clair and State of Illinois, have invented a certain new and useful Improvement in Faucets, of which the following is a full, clear, and exact description, reference being had to the accompanying drawings, forming part of this specification.

My invention relates to a faucet in which the plug is kept to its seat by the pressure of the liquid within the pipe or vessel, and my improvement consists in the construction hereinafter described, and pointed out in the claims.

Figure 1 is a perspective view of the parts disconnected. Figs. 2 and 3 are sectional views at 2 3, Fig. 4, Fig. 2 showing the cock closed, and Fig. 3 showing the cock open. Fig. 4 is an axial section, showing, like the previous figures, the cock or faucet in form of the waste-cock of a steam-engine cylinder. Fig. 5 shows in axial section the improvement applied to a faucet for beer or other barrels. Fig. 6 shows another modification.

The same letters will be applied to the same parts in both modifications.

I will first describe the invention as illustrated in the first series of figures.

A is a cap, having screw-threaded portion a, by which the faucet is connected to a cylinder, pipe, barrel, or other vessel containing fluid to be drawn through the faucet.

B is the body of the faucet, having a neck, b, and made fast to the cap by screwing therein or by other means.

C is a conical seat in the body, against which works the conical part D' of the plug D. The larger end of the plug has a recess, E, extending beneath the conical part D'.

From the inner end of the recess or cavity E extends a passage, E', that may, by turning the plug, be brought in line with the discharge-orifice B', extending through the body B. The stem D² of the plug may be turned by a lever, F, or other means fitting its angular part. It also has a circular part, d, which fits in the neck of the body. The lever is held on the stem by a nut, G, that holds the plug in place in the absence of pressure from within. When the faucet is in use, the outward pressure against the inner end of the plug keeps the conical part D' always in close contact with the seat C with a steady pressure, so that a tight ground joint is maintained by ordinary use of the faucet.

In Fig. 5 the improvement is shown applied to a beer-faucet, the stem of which has the usual form. In this case, as the pressure of the liquid might not always be sufficient to keep the plug up to its seat, a rubber washer may be interposed between the lever or hand-bar and the body, as shown at H, said elastic washer keeping the plug to its seat.

I is a screw-cap, stopping the hole through which the plug is inserted or removed.

By increasing the number of the eduction-openings B', the cock can be made a "three" or "four" way cock, the outflow from each opening being conveyed to a separate place.

It is not an essential feature of my invention that the plug should be made with a recess or passage in the inner end for the escape of fluid, the essential feature being that the turning plug shall be continuously pressed outwardly to its conical seat by the fluid in the pipe or vessel. One manner of carrying this out is shown in Fig. 6, which figure is part in elevation and part in section. In this modification the plug is bored diametrically through at E' for the passage of the fluid, and the plug is pressed to its seat by the fluid in a chamber, B², supplied from the bore B³ by a passage, B⁴.

I claim as my invention—

1. The combination of a faucet having a main liquid-passage, a plug having a conical part, and a body having a conical seat, the liquid-passage passing through the conical part of the plug, and a passage extending from the main liquid-passage to a chamber at the larger end of the plug, as set forth.

2. In a faucet, the combination of a body, B, having a neck, b, conical seat C, and discharge-orifice B' through said conical seat, and a plug, D, having conical part D' to fit the seat, and stem D², formed with circular part d to fit the neck, the conical part being formed with a cavity, E, and passage E', leading to the discharge-orifice, as set forth.

GEORGE SHONE.

Witnesses:
SAML. KNIGHT,
GEO. H. KNIGHT.